US012586476B2

(12) United States Patent
Litvova et al.

(10) Patent No.: US 12,586,476 B2
(45) Date of Patent: Mar. 24, 2026

(54) METHOD AND SYSTEM FOR AUTOMATICALLY GUIDING AN AIRCRAFT TO A LANDING RUNWAY

(71) Applicants: Airbus (S.A.S.), Blagnac Cedex (FR); Airbus Operations (S.A.S.), Toulouse (FR)

(72) Inventors: Monika Litvova, Toulouse (FR); Emmanuel Penverne, Toulouse (FR); Denys Bernard, Blagnac (FR); Albert Gine Soca, Toulouse (FR)

(73) Assignees: Airbus (S.A.S.), Blagnac (FR); Airbus Operations (S.A.S.), Toulouse (FR)

( * ) Notice: Subject to any disclaimer, the term of this patent is extended or adjusted under 35 U.S.C. 154(b) by 20 days.

(21) Appl. No.: 18/770,043

(22) Filed: Jul. 11, 2024

(65) Prior Publication Data

US 2025/0029502 A1 Jan. 23, 2025

(30) Foreign Application Priority Data

Jul. 18, 2023 (FR) ...................................... 2307691

(51) Int. Cl.
*G08G 5/54* (2025.01)
*G08G 5/26* (2025.01)
*G10L 15/26* (2006.01)

(52) U.S. Cl.
CPC ................. *G08G 5/54* (2025.01); *G08G 5/26* (2025.01); *G10L 15/26* (2013.01)

(58) Field of Classification Search
None
See application file for complete search history.

(56) References Cited

U.S. PATENT DOCUMENTS

| | | | |
|---|---|---|---|
| 2007/0288128 A1 | 12/2007 | Komer | |
| 2008/0039988 A1 | 2/2008 | Estabrook | |
| 2017/0076611 A1* | 3/2017 | Shamasundar | G08G 5/50 |
| 2017/0249852 A1 | 8/2017 | Haskins | |
| 2021/0090444 A1* | 3/2021 | Bortolini | G08G 5/26 |
| 2021/0295710 A1* | 9/2021 | Saptharishi | G10L 15/26 |
| 2022/0115008 A1 | 4/2022 | Pust | |
| 2024/0062664 A1* | 2/2024 | He | G08G 5/51 |

FOREIGN PATENT DOCUMENTS

FR 3009759 A1 2/2015

* cited by examiner

*Primary Examiner* — Lail A Kleinman
(74) *Attorney, Agent, or Firm* — KDW Firm PLLC

(57) ABSTRACT

A method for automatically guiding an aircraft includes receiving an ATIS message and decoding the content of the ATIS message. If the decoded content of the ATIS message includes a parameter relating to an active landing runway, the method includes creating a message requesting confirmation of the decoded content and commanding the sending of the message over a communication frequency with air traffic control, receiving a response from air traffic control and decoding the response to determine whether or not the response is a confirmation of the decoded content of the ATIS message. If the response is a confirmation of the decoded content of the ATIS message, the method includes determining a contingency trajectory of the aircraft at least partially in consideration of the decoded content of the ATIS message. The method also includes automatically guiding the aircraft along the determined contingency trajectory.

10 Claims, 3 Drawing Sheets

METHOD AND SYSTEM FOR AUTOMATICALLY GUIDING AN AIRCRAFT TO A LANDING RUNWAY

TECHNICAL FIELD

The disclosure herein relates to the field of automatic landing of aircraft, in particular in a situation in which a pilot of the aircraft is incapacitated. In a situation in which a pilot of the aircraft is incapacitated, thereby preventing the pilot from controlling the aircraft, in particular if the aircraft has just one pilot, it is known to determine a contingency trajectory enabling the aircraft to be brought to a diversion airport and to guide the aircraft along this contingency trajectory.

BACKGROUND

Document FR3121208A1 describes a method and a system for generating such a contingency trajectory. The determination of such a contingency trajectory presupposes knowledge of at least one landing runway on which the aircraft could land. For this purpose, a solution envisaged by the inventors involves the aircraft receiving information via ATIS messages (Automatic Terminal Information Service) relating to at least one landing runway. ATIS is a continuous airport-information broadcasting service. It broadcasts messages relating notably to active landing runways, the state of the landing runways, etc. However, it is not possible to guarantee the integrity of the information in ATIS messages, especially since these messages are usually only issued in voice form for most airports. There is therefore a need for a solution for providing the aircraft with uncorrupted information on a usable landing runway to determine a contingency trajectory enabling the aircraft to land on the landing runway.

SUMMARY

The disclosure herein is notably intended to provide a solution to this problem. The disclosure herein relates to a method for automatically guiding an aircraft to a landing runway. The method is noteworthy in that it comprises the following steps implemented automatically by electronic circuitry on board the aircraft:

- a first step that involves receiving at least one ATIS message;
- a second step that involves decoding the content of the at least one ATIS message received in the first step;
- a third step implemented if the decoded content of the at least one ATIS message comprises a parameter relating to an active landing runway, that involves creating a message requesting confirmation of the decoded content and commanding the sending of the message over a communication frequency with air traffic control;
- a fourth step that involves receiving a response from air traffic control to the message sent in the third step and decoding the response to determine whether or not the response is a confirmation of the decoded content of the at least one ATIS message;
- a fifth step implemented if the response is a confirmation of the decoded content of the at least one ATIS message, the fifth step comprising the determination of a contingency trajectory of the aircraft at least partially in consideration of the decoded content of the at least one ATIS message; and

- a sixth step that involves automatically guiding the aircraft along the contingency trajectory determined in the fifth step.

Thus, the method according to the disclosure herein enables a confirmation or a non-confirmation of the content of an ATIS message received by the aircraft to be obtained automatically from air traffic control, followed by automatic determination, in the event of confirmation, of a contingency trajectory of the aircraft at least partially in consideration of the content of the ATIS message, followed by automatic guidance of the aircraft along this contingency trajectory. This therefore makes determination of the contingency trajectory more secure, since the contingency trajectory is determined using information contained in the ATIS message and confirmed by air traffic control. In the event of an error in the ATIS message or during decoding of the ATIS message on board the aircraft, this error is detected by air traffic control, which then does not confirm the content of the message.

According to one embodiment, the first step involves receiving the ATIS message in voice form and the second step comprises a voice-recognition substep of recognizing the message received in voice form.

According to one embodiment, the third step comprises:

- converting the message requesting confirmation of the decoded content into a voice message using speech synthesis, and
- commanding the sending of the voice message over the communication frequency with air traffic control.

According to one embodiment, the fifth step comprises a first syntactic-analysis substep of analyzing on one hand the decoded content of the at least one ATIS message and on the other hand the response from air traffic control decoded in the fourth step, as well as a second substep corresponding to the determination of the contingency trajectory, the second substep only being implemented if the decoded content of the at least one ATIS message satisfies predefined syntactic rules and if the response from air traffic control decoded in the fourth step also satisfies predefined syntactic rules.

According to one embodiment, the parameter relating to the active landing runway comprises at least one of the following parameters:

- an identification of the active landing runway,
- a state of the active landing runway.

The disclosure herein also relates to a system for automatically guiding an aircraft to a landing runway. The guidance system is noteworthy in that it comprises electronic circuitry configured to implement an automatic guidance method as set out above.

The disclosure herein also relates to an aircraft comprising such an automatic guidance system.

BRIEF DESCRIPTION OF THE DRAWINGS

The disclosure herein will be better understood upon reading the following description and upon studying the appended figures.

DETAILED DESCRIPTION

Figure 1:
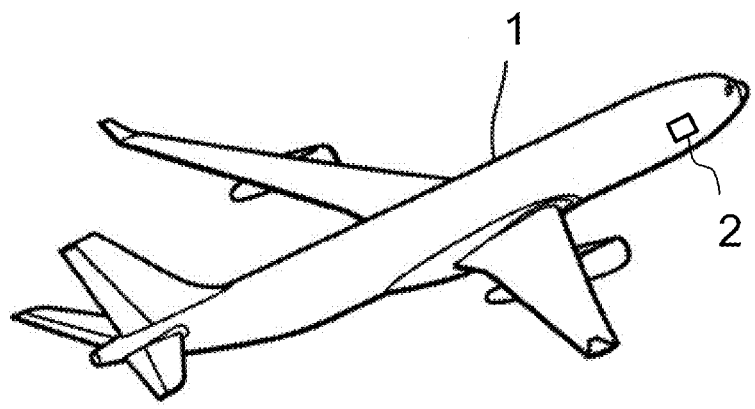
FIG. 1 shows an aircraft comprising an automatic guidance system.
Figure 2:
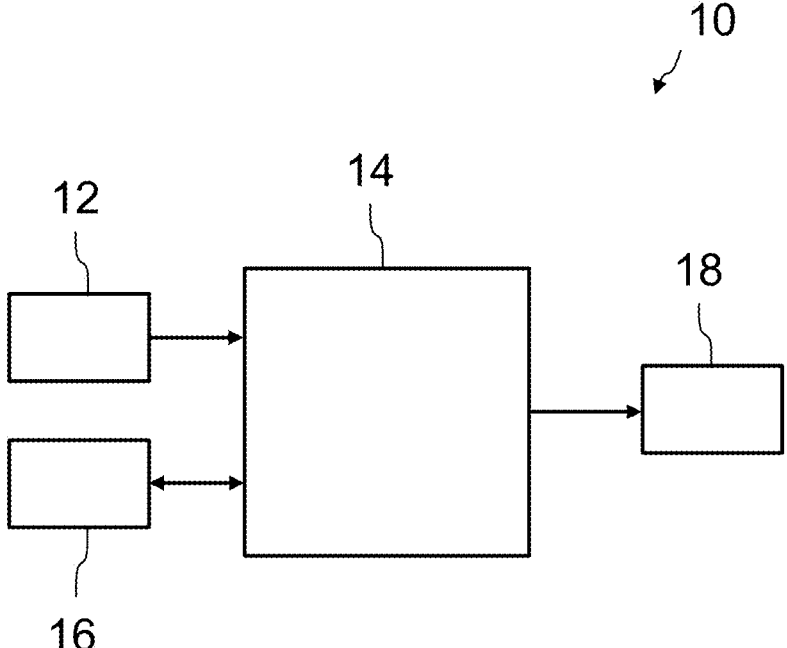
FIG. 2 schematically illustrates a system for automatically guiding an aircraft according to one embodiment of the disclosure herein.

The aircraft 1 shown in FIG. 1 comprises an automatic guidance system 10 as shown in FIG. 2. The automatic guidance system 10 comprises electronic circuitry 14 connected at input to an ATIS message receiver 12. The electronic circuitry 14 also has a two-way link to a radio communication device 16 of the aircraft, for example a very-high-frequency (VHF) device, intended for communication with air traffic control. The electronic circuitry 14 is also connected at output to a guidance computer 18 of the aircraft. According to one embodiment, the electronic circuitry 14 is an avionics computer of the aircraft. According to another embodiment, the electronic circuitry 14 is an FPGA programmable logic circuit. The automatic guidance system 10 is for example installed in an avionics bay 2 of the aircraft 1.

Figure 3:
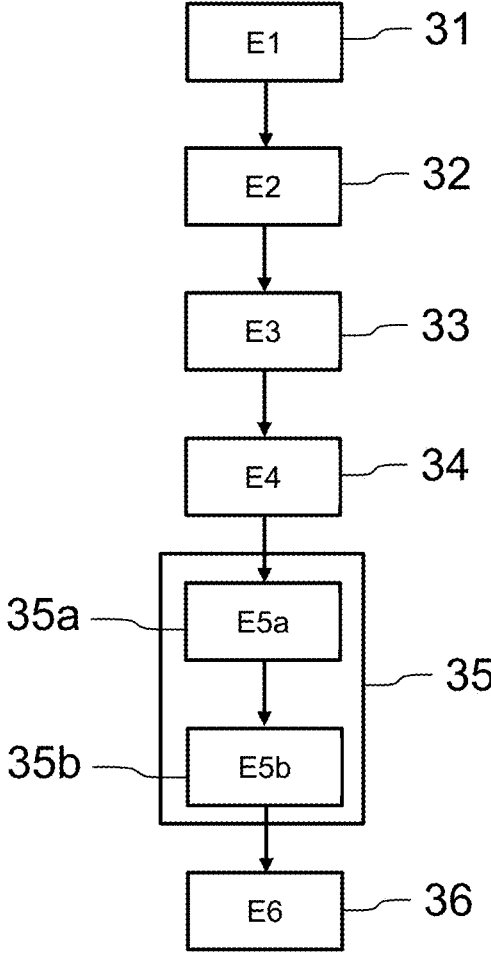
FIG. 3 illustrates a method for automatically guiding an aircraft according to one embodiment of the disclosure herein.

The electronic circuitry 14 and the guidance computer 18 of the aircraft are configured to implement the automatic guidance method illustrated in FIG. 3.

A first step 31 of the method, marked E1 in the figure, involves receiving at least one ATIS message from the receiver 12. The receiver 12 is a radio frequency receiver carried on board the aircraft and that is configured to receive messages from the ATIS information broadcasting service over a communication frequency corresponding to the ATIS service.

Figure 4:
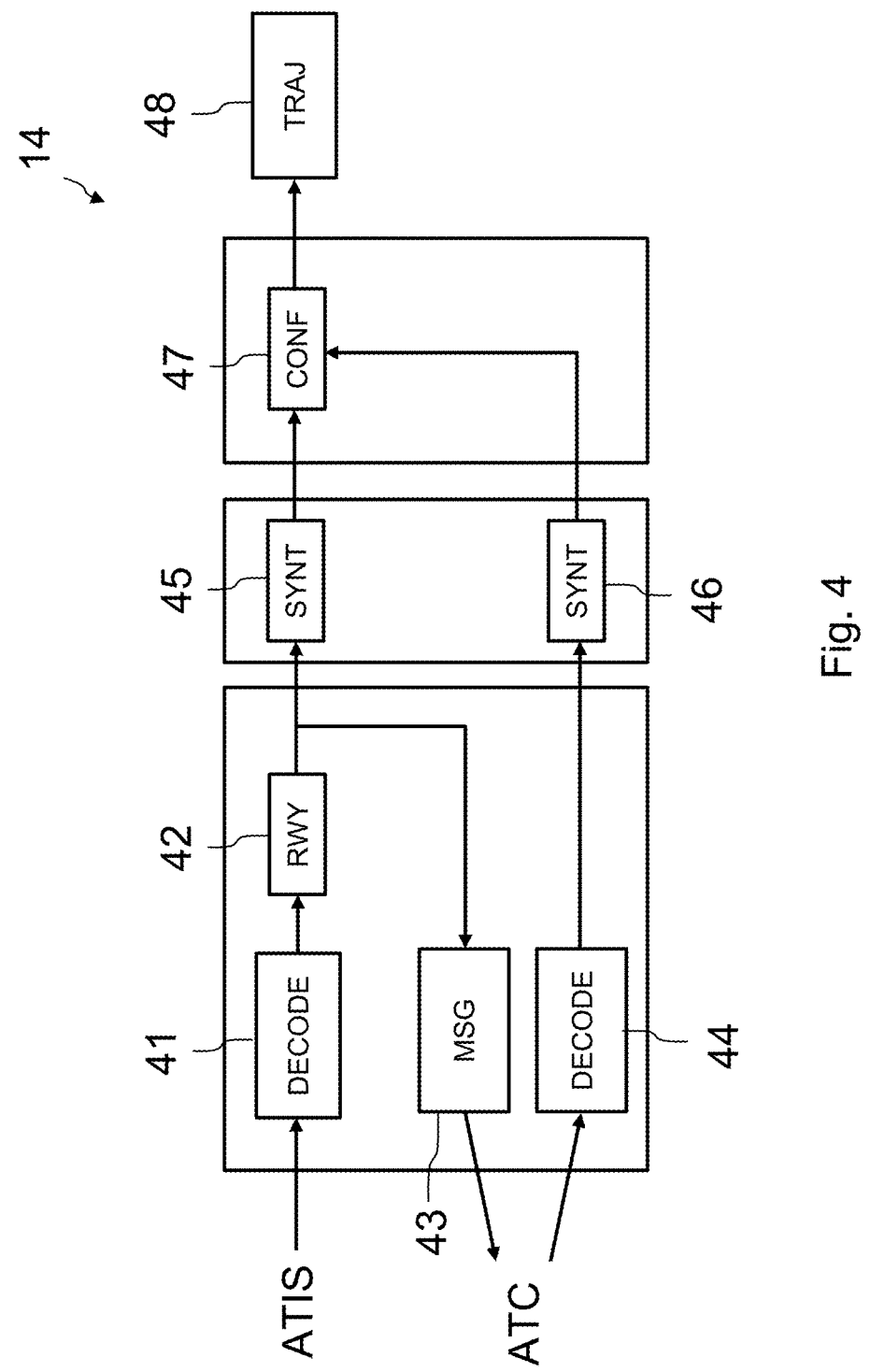
FIG. 4 is a functional illustration of the automatic guidance method in FIG. 3.

Following receipt of the at least one ATIS message, in a second step 32 of the method, marked E2 in FIG. 3, the electronic circuitry 14 decodes the content of the at least one ATIS message received in the first step. The decoding of the content of the message notably comprises the identification, on one hand, of a type of parameter transmitted in the ATIS message and, on the other hand, of a value corresponding to this parameter. The type of parameter may for example be an identification of an active landing runway, a state of a landing runway, a temperature at an airport, the wind conditions at an airport, etc. The decoding of the content of the message in the second step 32 is for example a text analysis of the message to identify a type of parameter and a value of the parameter. As illustrated in FIG. 4, the second step 32 is for example implemented by a function 41 of the electronic circuitry 14. This function 41, marked DECODE in FIG. 4, receives the ATIS message and decodes the content of the ATIS message.

In a specific embodiment, if the message received in the first step 31 is a voice message, the second step 32 further comprises a first voice-recognition substep of recognizing the message received in voice form to transform the message into a text message. This first substep is implemented before the content of the message is decoded.

Once the content of the received message has been decoded, in a third step 33 marked E3 in FIG. 2, the electronic circuitry 14 checks whether the decoded content of the ATIS message comprises a parameter relating to an active landing runway. In particular, such a parameter relating to an active landing runway is an identification of the active landing runway or a state of the active landing runway. The state of the landing runway is for example one of the following values: dry, wet, presence of snow, ice, etc. If the decoded content of the ATIS message comprises a parameter relating to an active landing runway, the electronic circuitry 14 creates a message requesting confirmation of the decoded content and commands the sending of the message by the radio communication device 16 over a communication frequency with air traffic control. To enable a confirmation or a non-confirmation of the decoded content of the ATIS message, the confirmation request message at least partially comprises the decoded content of the ATIS message. In particular, the confirmation request message comprises at least the parameter relating to an active landing runway. In a specific embodiment, the electronic circuitry 14 creates the message in text form then transforms it, using speech synthesis, into a voice message, before commanding the sending of the voice message over the communication frequency with air traffic control. As illustrated in FIG. 4, the third step 33 is for example implemented by a verification function 42, marked RWY (for "runway") and by a function 43 sending a message, marked MSG. The verification function 42 checks whether the decoded content of the ATIS message coming from the decoding function 41 comprises a parameter relating to an active landing runway. The function 43 sending a message creates the message requesting confirmation of the decoded content and commands the sending of the message over the communication frequency with air traffic control (ATC).

In a fourth step 34, marked E4 in FIG. 2, the electronic circuitry 14 receives, from the radio communication device 16, a response from air traffic control to the message sent in the third step 33. The electronic circuitry decodes the response received to determine whether or not this response is a confirmation of the decoded content of the at least one ATIS message. In a specific embodiment, the response from air traffic control is received by the radio communication device 16 in the form of a voice message. The fourth step 34 then comprises a first voice-recognition substep of recognizing the received voice message, on completion of which the voice message is transformed into a text message. The decoding by the electronic circuitry 14 of the received response is for example an analysis of the text message to identify keywords corresponding to a confirmation or to a non-confirmation of the decoded content of the at least one ATIS message. As illustrated in FIG. 4, the fourth step 34 is for example implemented by a function 44 of the electronic circuitry 14. This function 44, marked DECODE in FIG. 4, receives the response from air traffic control ATC and decodes the response.

Following decoding of the response received from air traffic control in the fourth step 34, a fifth step 35 is implemented by the electronic circuitry 14 if the response from air traffic control is a confirmation of the decoded content of the at least one ATIS message. The fifth step comprises the determination of a contingency trajectory of the aircraft at least partially in consideration of the decoded content of the at least one ATIS message. Since the decoded content of the at least one ATIS message comprises a parameter relating to an active landing runway, the contingency trajectory is determined in consideration of the parameter, which is for example an identification of the active landing runway or a state of the active landing runway. As illustrated in FIG. 4, the fifth step 35 is for example implemented by a confirmation verification function 47, marked CONF in the figure, and by a function 48 determining a contingency trajectory, marked TRAJ in the figure. The function 47 receives the decoded content of the at least one ATIS message from the function 41 via the function 42. The function 47 also receives the response from air traffic control decoded by the function 44. The function 47 transmits the decoded content of the at least one ATIS message to the function 48 only if the decoded response from air traffic control is a confirmation of the decoded content of the at least one ATIS message. The function 48 determines the contingency trajectory.

In a specific embodiment, the fifth step 35 comprises a first syntactic-analysis substep 35*a*, marked E5*a* in FIG. 2, of analyzing on one hand the decoded content of the at least one ATIS message and on the other hand the decoded response from air traffic control. In the first substep 35*a*, the electronic circuitry 14 analyzes the syntax of the decoded content of the at least one ATIS message to check whether the decoded content of the at least one ATIS message satisfies predefined syntactic rules. The electronic circuitry 14 also analyzes the syntax of the response from air traffic control decoded in the fourth step to check whether this response also satisfies predefined syntactic rules. As illustrated in FIG. 4, the first substep 35*a* is for example implemented by two syntactic-analysis functions 45 and 46 of the electronic circuitry 14, each marked SYNT in the figure. The function 45 analyzes the syntax of the decoded content of the at least one ATIS message and transmits the decoded content of the at least one ATIS message to the function 47 only if this content satisfies the predefined syntactic rules. The function 46 also analyzes the syntax of the response from air traffic control decoded by the function 44 and transmits the decoded response to the function 47 only if the decoded response satisfies the predefined syntactic rules. The fifth step 35 also comprises a second substep 35*b*, marked E5*b* in FIG. 2, corresponding to determination of the contingency trajectory. However, the second substep 35*b* is only implemented if the decoded content of the at least one ATIS message satisfies the predefined syntactic rules and if the decoded response from air traffic control also satisfies the predefined syntactic rules. This prevents the contingency trajectory from being determined in consideration of the parameter relating to the active landing runway if this parameter is liable to be corrupted. This helps to further guarantee the safety of the flight of the aircraft along the determined contingency trajectory.

Following determination of the contingency trajectory in the fifth step 35, the electronic circuitry 14 transmits the determined contingency trajectory to the guidance computer 18 of the aircraft, and in a sixth step 36, marked E6 in FIG. 2, the guidance computer 18 of the aircraft commands the automatic guidance of the aircraft along the contingency trajectory determined in the fifth step.

The method according to the disclosure herein is advantageous in that it enables the contingency trajectory to be determined using information broadcast near-continuously over the communication frequency corresponding to the ATIS service. This therefore prevents the congestion of another communication frequency to specifically request and receive the information.

The method is also advantageous in that requesting a confirmation from air traffic control enhances the reliability of the content of the ATIS message decoded on board the aircraft by having this content (at least the content that is used to determine the contingency trajectory) validated by an authority independent of the ATIS service, specifically air traffic control. This guarantees that the decoded content used to determine the contingency trajectory is reliable enough to guarantee the safety of the flight of the aircraft along the contingency trajectory.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for automatically guiding an aircraft to a landing runway, comprising steps implemented automatically by electronic circuitry on board the aircraft, the steps comprising:

a first step of receiving at least one Automatic Terminal Information Service (ATIS) message;

a second step of decoding content of the at least one ATIS message received in the first step;

a third step, implemented in response to the decoded content of the at least one ATIS message including a parameter relating to an active landing runway, of creating a message requesting confirmation of the decoded content and commanding sending of the message over a communication frequency with air traffic control, the confirmation request message comprising at least the parameter relating to an active landing runway included in the decoded content of the at least one ATIS message;

a fourth step of receiving a response from air traffic control to the message sent in the third step and decoding the response to determine whether or not the response is a confirmation of the decoded content of the at least one ATIS message;

a fifth step implemented if the response is a confirmation of the decoded content of the at least one ATIS message, the fifth step comprising determination of a contingency trajectory of the aircraft at least partially in consideration of the decoded content of the at least one ATIS message; and a sixth step of automatically guiding the aircraft along the contingency trajectory determined in the fifth step.

2. The method according to claim 1, wherein the first step comprises receiving the ATIS message in voice form and the second step comprises a voice-recognition substep of recognizing the message received in voice form.

3. The method according to claim 1, wherein the third step comprises:

converting the message requesting confirmation of the decoded content into a voice message using speech synthesis; and commanding the sending of the voice message over the communication frequency with air traffic control.

4. The method according to claim 1, wherein the fifth step comprises a first syntactic-analysis substep of analyzing the decoded content of the at least one ATIS message and the response from air traffic control decoded in the fourth step, as well as a second substep corresponding to the determination of the contingency trajectory, the second substep only being implemented if the decoded content of the at least one ATIS message satisfies predefined syntactic rules and if the response from air traffic control decoded in the fourth step also satisfies predefined syntactic rules.

5. The method according to claim 1, wherein the parameter relating to the active landing runway comprises at least one of:

an identification of the active landing runway, a state of the active landing runway.

6. A system for automatically guiding an aircraft to a landing runway, comprising electronic circuitry configured to implement the method according to claim 1.

7. An aircraft comprising the system according to claim 6.

8. The method of claim 1, wherein decoding the content of the at least one ATIS message includes identifying a type of the parameter and a value of the parameter.

9. The method of claim 5, wherein the state of the active landing runway includes a temperature or wind condition at the active landing runway.

10. The method of claim 5, wherein the state of the active landing runway is defined using a value, including one of dry, wet, presence of snow, or ice.

* * * * *